May 2, 1961 C. GERST 2,982,151
COUNTERROTATING TRANSMISSION AND STEERING AXLE
Filed Nov. 28, 1958 5 Sheets-Sheet 3

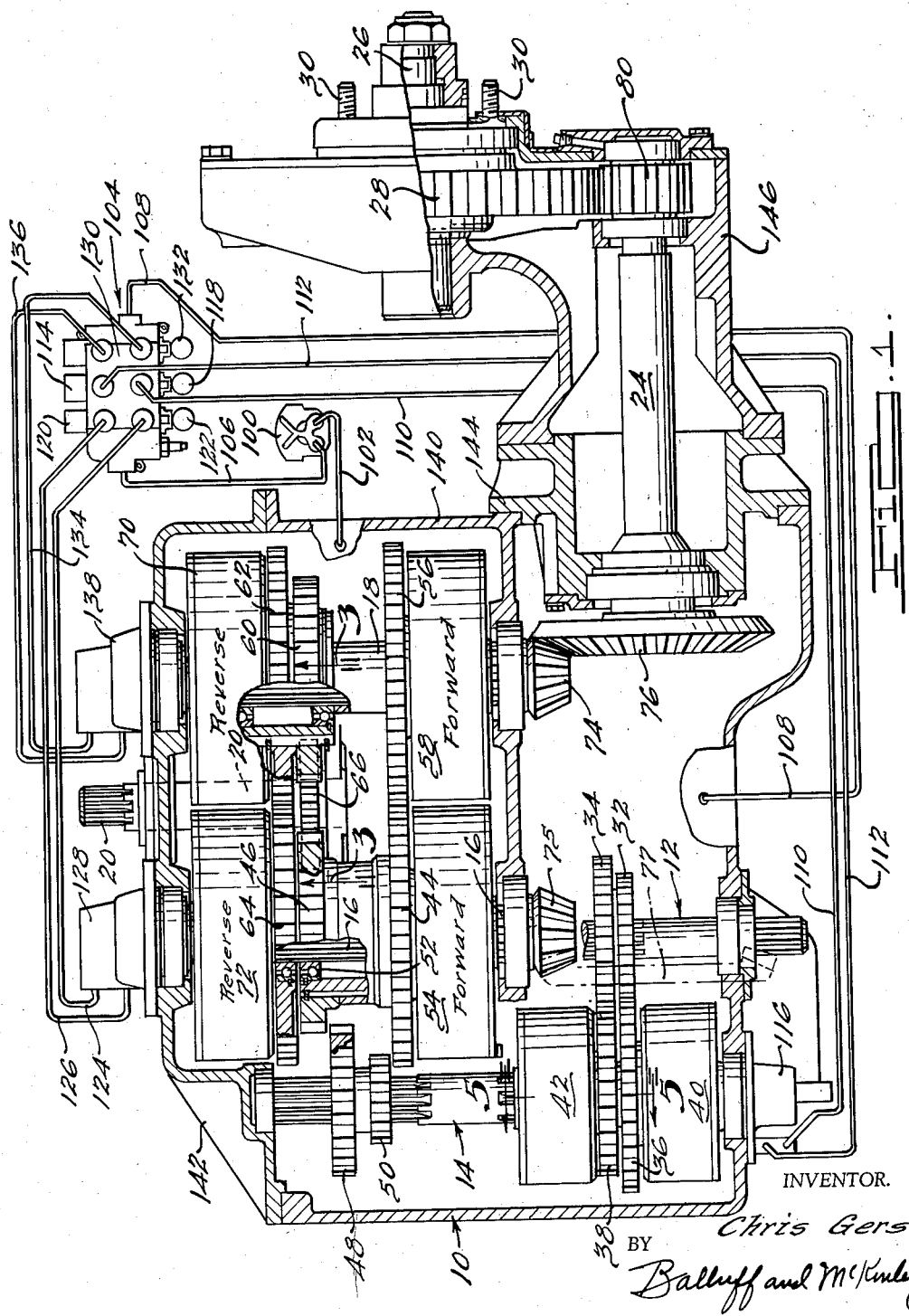

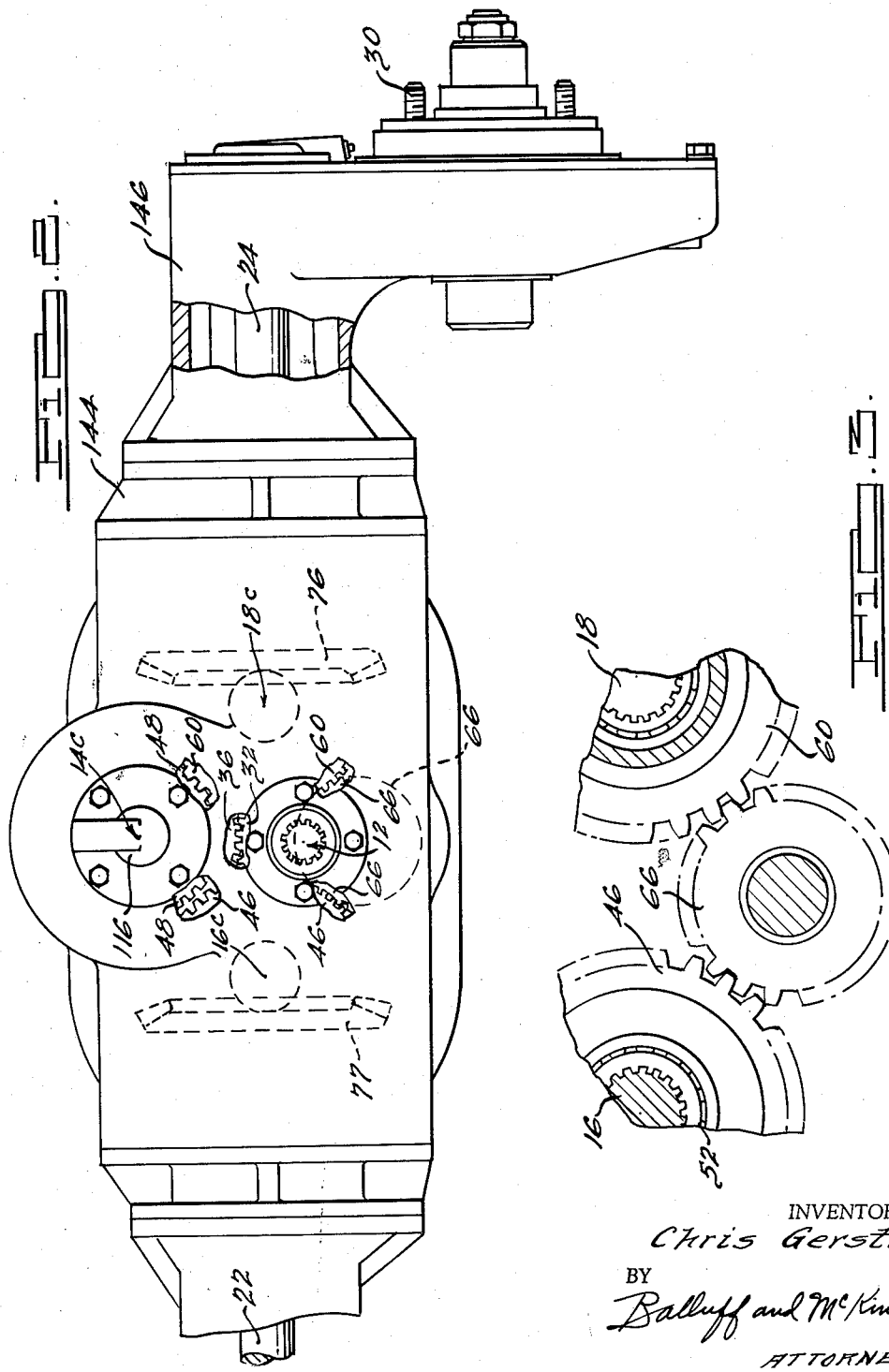

INVENTOR.
Chris Gerst.
BY
Balluff and McKinley
ATTORNEYS.

INVENTOR.
Chris Gerst.
BY
Balluff and McKinley
ATTORNEYS.

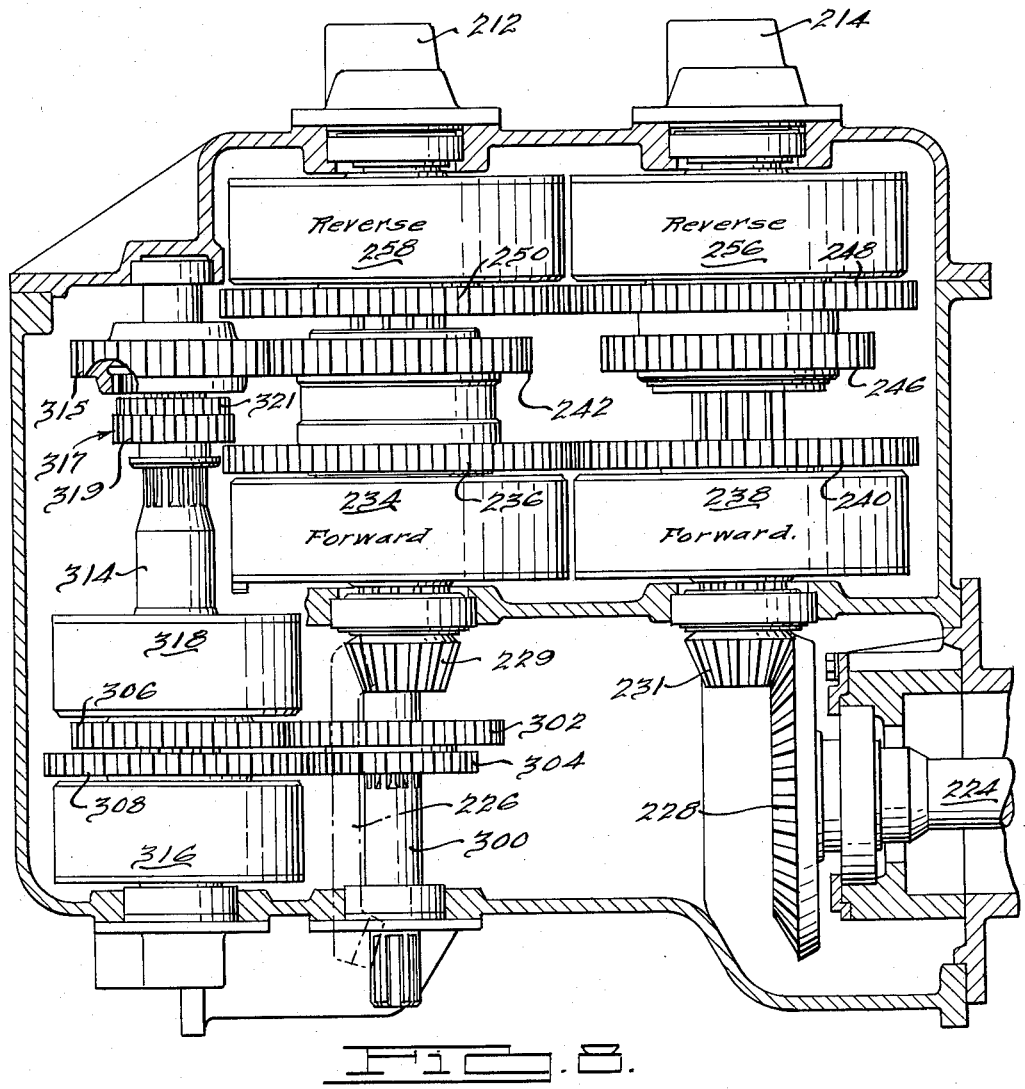

United States Patent Office 2,982,151
Patented May 2, 1961

2,982,151

COUNTERROTATING TRANSMISSION AND STEERING AXLE

Chris Gerst, 19303 W. Davison, Detroit 23, Mich.

Filed Nov. 28, 1958, Ser. No. 776,998

22 Claims. (Cl. 74—665)

This invention relates to power transmissions and has particular reference to a counterrotating transmission and steering axle assembly which is particularly adapted for use in tractor type vehicles and is adapted to provide a multi-speed forward and reverse drive for each driving sprocket or wheel of the tractor, the arrangement being such that one of the drive sprockets may be driven independently of the other, or in one direction while the other is being driven in the opposite direction.

A principal object of the invention, therefore, is to provide a novel, simple, and relatively inexpensive multi-speed forward and reverse counterrotating type of transmission and steering axle.

Other and further objects of the invention will be apparent from the following description and claims and may be understood by reference to the accompanying drawings, of which there are five sheets, which by way of illustration show preferred embodiments of the invention and what I now consider to be the best mode of applying the principles thereof. Other embodiments of the invention may be used without departing from the scope of the present invention as set forth in the appended claims.

In the drawings:

Figure 1 is a fragmentary developed sectional view of a power transmitting mechanism embodying my invention and with the hydraulic controls therefor illustrated schematically;

Figure 2 is a fragmentary front elevational view of the transmission illustrated in Figure 1;

Figure 3 is a fragmentary sectional view taken along the line 3—3 of Figure 1;

Figure 8 is a fragmentary developed sectional view of a further modification of the invention.

Figure 4:
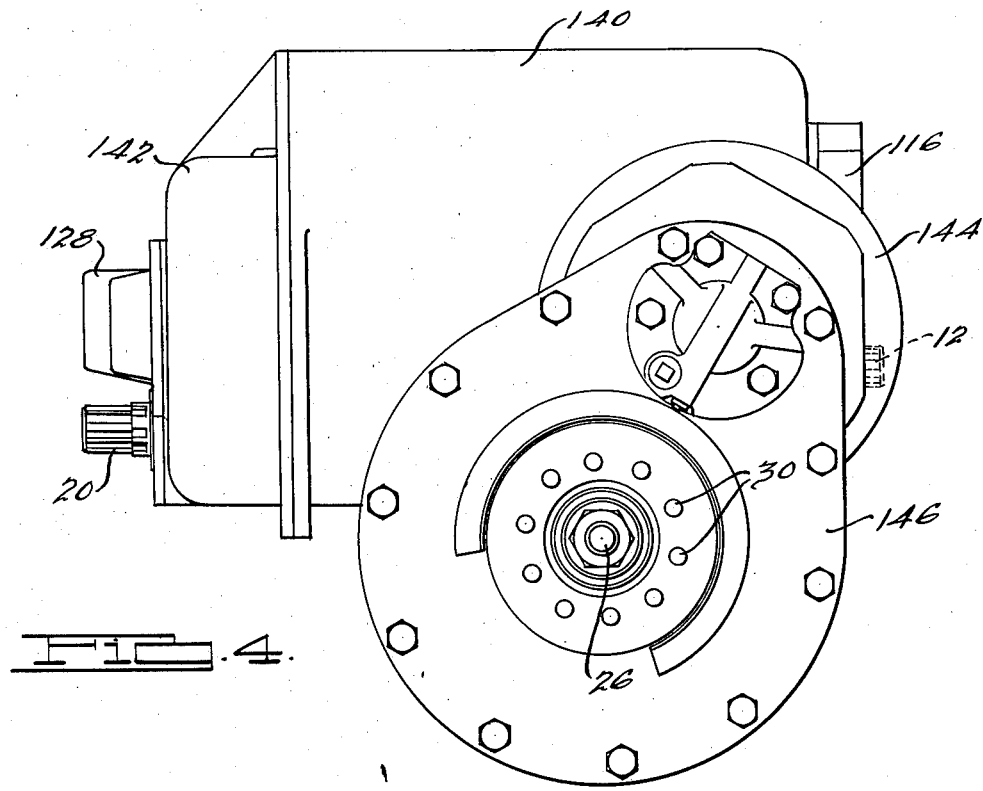
Figure 4 is a side elevational view of the transmission shown in Figures 1, 2 and 3.

The transmission shown in Figures 1 to 5 inclusive is a four-speed counterrotating steering axle which provides independent four-speed drives in both forward and reverse directions with a power take-off.

As illustrated in Figures 1 to 5, the transmission comprises in general a housing 10, a first input shaft 12 suitably driven from the engine of the vehicle, a second input shaft 14, a pair of clutch shafts 16 and 18, a power take-off and idler shaft 20, a pair of output shafts 22 and 24, and a pair of stub axles 26. The axles 26 are axially aligned and project laterally from opposite sides of the transmission housing, and each has journaled thereon a final drive gear 28 provided with a series of bolts 30 upon which is mounted a road wheel or a driving sprocket for the tread for one side of a crawler type tractor.

The shaft 12 has gears 32 and 34 fixed thereon for rotation therewith, the gear 32 being in constant mesh with gear 36 journaled on the shaft 14, while the gear 34 is in constant mesh with the gear 38 journaled on the shaft 14. A normally disengaged multiple disc clutch 40 is mounted on the shaft 14 and is adapted when engaged to couple the gear 36 to the shaft 14 for driving the latter. A similar clutch 42 is operatively disposed between the gear 38 and the shaft 14 and is adapted when engaged to couple the gear 38 to the shaft 14 for driving the latter. Thus, depending upon which of the clutches 40 and 42 is engaged, the shaft 14 may be driven selectively at two different speeds from the shaft 12. The shaft 12 is centrally disposed, as shown in Figure 2, and immediately below and parallel with the shaft 14, the center 14c of which is indicated in Figure 2. The output shafts 22 and 24 and the clutch shafts 16 and 18 are generally symmetrically disposed with respect to the shafts 12 and 14. In Figure 2, 16c designates the center of the shaft 16 and 18c the center of the shaft 18. The shafts 16 and 18 are disposed parallel to each other and to the shaft 14.

A sliding double gear unit consisting of gears 48 and 50 is slidably splined to the shaft 14 and is shown in its neutral position in Figure 1. Suitable shifting means (not shown) are provided for selectively engaging the teeth of the gear 50 with the teeth of a gear 56 for driving the latter, or the teeth of the gear 48 with the teeth of a gear 60 for driving the latter. A pair of bearings, such as 52, journal a double gear unit 44, 46 on the clutch shaft 16. Gear 44 is in constant mesh with gear 56. A normally disengaged multiple disc clutch 54 mounted on the shaft 16 is operatively disposed between the gear 44 and the shaft 16 and is adapted when engaged to couple the double gear unit 44, 46 to the shaft 16 for driving the latter.

A clutch 58 like the clutches 40, 42 and 54 is operatively disposed between the gear 56 and the shaft 18 on which it is journaled and is adapted when engaged to couple the gear 56 to the shaft 18 for driving the latter.

A double gear unit consisting of gears 60 and 62 is journaled on the shaft 18. The teeth of the gear 62 are in constant mesh with the teeth of the gear 64 journaled on the shaft 16. An idler gear 66 fixed to the idler shaft 20 has its teeth in constant mesh with the gears 46 and 60. A normally disengaged multiple disc clutch 70 is mounted on the shaft 18 and is operatively disposed between the gear 62 and the shaft 18 and adapted when engaged to couple the gear 62 to the shaft 18 for driving the latter. A similar clutch 72 mounted on the shaft 16 is operatively disposed between the gear 64 and the shaft 16 and is adapted when engaged to couple the gear 64 to the shaft 16 for driving the latter.

The shaft 18 is provided with a bevel pinion 74, the teeth of which mesh with a bevel gear 76 fixed to the shaft 24 for rotating the latter. A bevel gear 75 fixed to the shaft 16 has its teeth in mesh with the teeth of a bevel gear 77 carried by the output shaft 22. Each of the shafts 22 and 24 is provided with a gear 80, the teeth of which are in mesh with the teeth of gear 28 for driving the latter.

It will thus be evident that the gears 32 and 34 on the shaft 12, the gears 36 and 38 on the shaft 14, and their associated clutches 40 and 42, and the gears 48 and 50 on the shaft 14 provide a four-speed drive between the shaft 12 and the gears 56 and 60; that the gears 44 and 56, being in constant mesh, will rotate together but in opposite directions; that the gears 62 and 64, being in constant mesh, will rotate together but in opposite directions; that the gears 44 and 64 will rotate in opposite directions; and that the gears 56 and 62 will turn in opposite directions.

The clutches 58 and 54 are forward drive clutches while the clutches 70 and 72 are reverse drive clutches. The shaft 18 and the clutches and gears thereon are coupled through the gears 74 and 76 and shaft 24 to the final drive gear 28 on one side of the transmission, while the clutches and gears on the shaft 16 are coupled through the gears 75 and 77 and the output shaft 22 to the final drive gear 28 on the opposite side of the transmission.

Figure 5:
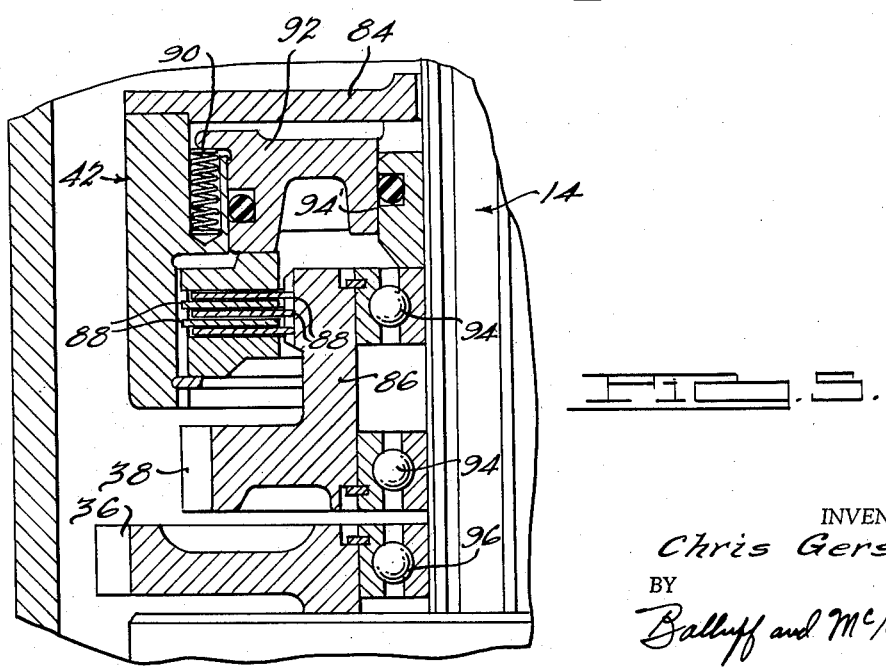
Figure 5 is an enlarged fragmentary sectional view of one of the multiple disc clutches taken along the line 5—5 of Figure 1.

As shown in Figure 5, the clutch 42 comprises a drum 84 splined to the shaft 14 to rotate therewith and a hub 86 which forms an integral part of the hub of gear 38. The drum 84 and the hub 86 form driven and driving members of the clutch 42, which further includes a series of interleaved clutch disc 88, a set of such discs being fixed to rotate with the drum 84 while another set of such discs is fixed to rotate with the hub 86, the discs of such sets being interleaved.

A series of springs 90 disposed around the clutch drum react on the same and on an annular piston 92 to normally maintain the piston 92 in its retracted position. The piston 92 is reciprocable in an annular cylinder 94'. Hydraulic liquid under pressure is supplied to the rear of the piston 92 for forcing the same in a direction to compress the clutch discs 88 for clamping the same together so as to engage the clutch 42. In the absence of hydraulic fluid under pressure, the springs 90 maintain the piston 92 in its retracted position and permit separation of the clutch discs and hence disengagement of the clutch. The multiple disc hydraulically actuated clutch construction herein disclosed is the same as that disclosed and claimed in my prior application Serial No. 530,025, filed August 23, 1955, for "Hydraulically Actuated Multiple Disc Clutch," now Patent No. 2,880,834.

The gear 38 and the hub 86 are mounted on the shaft 14 by means of a pair of bearings 94, while the gear 36 is journaled on the shaft 14 by means of a bearing 96. When the clutch 42 is disengaged the gear 38 will run free on the shaft 14, but when the clutch 42 is engaged the gear 38 will be coupled to the shaft 14 for driving the latter. The clutches 40, 54, 58, 70 and 72 have essentially the same construction as the clutch 42 and are all normally disengaged.

The shaft 14 upon which the clutch 42 is mounted is provided with an axial bore or passage (not shown) through which hydraulic fluid under pressure is supplied to the cylinder 94' of the clutch behind the piston 92, whereby hydraulic fluid under pressure may be supplied to the clutch 42 for actuating or engaging the same. The shaft 14 is also provided with a duct (not shown) through which hydraulic fluid under pressure is supplied to the hydraulic cylinder of the clutch 40 for actuating the same. Similarly, the shafts 16 and 18 are provided with ducts for supplying hydraulic fluid to the clutches mounted thereon for actuating the same. It will be understood that when the pressure of the hydraulic fluid is released, the springs 90 of each clutch will immediately effect the disengagement thereof.

A hydraulic control system for controlling the engagement and disengagement of the clutches 40, 42, 54, 58, 70 and 72 is schematically illustrated in Figure 1 and consists of a continuously driven hydraulic pump 100 supplied with hydraulic fluid, such as oil, through a line 102 from the oil supply in the transmission housing 10 and a valve unit 104 which includes a series of valves. A line 106 supplies oil under the discharge pressure of the pump 100 to the valve unit 104, and a return line 108 returns hydraulic fluid from the valve unit 104 to the transmission housing. Lines 110 and 112 connect one of the valves 114 of the unit 104 to a cap or coupling 116 mounted on the transmission case around the end of the shaft 14 which projects therefrom. The cap 116 provides communication between the line 110 and the duct in the shaft 14 which communicates with the hydraulic actuating cylinder of the clutch 42, while the line 112 is connected by the cap 116 with the duct in the shaft 14 which communicates with the hydraulic actuating cylinder of the clutch 40. The valve 114 is normally positioned so that the lines 110 and 112 are ported to the return line 108, thus relieving the pressure in the hydraulic cylinders 94' of the clutches 40 and 42.

A pivoted handle 118 shown in neutral position is movable in one direction from neutral so that the valve 114 will connect the line 110 with the hydraulic fluid under the discharge pressure of the pump 100, thereby supplying fluid under pressure to the hydraulic cylinder 94' of the clutch 42 for energizing the same. When the handle 118 is returned to neutral position, the valve 114 will relieve the pressure in the line 110 and the hydraulic cylinder 94' of the clutch 42 and thus permit the springs 90 immediately to disengage the clutch 42.

Movement of the handle 118 from neutral in the opposite direction will connect the line 112 to the hydraulic fluid under the discharge pressure of the pump 100, thereby to supply fluid under pressure to the hydraulic cylinder of the clutch for engaging the same, and return of such handle 118 from such position to neutral will relieve the pressure in the hydraulic cylinder of the clutch 40 and thereby permit the springs thereof to effect the immediate disengagement of the clutch 40. Thus the handle 118 may be shifted from its neutral position in which it is shown in one direction or the other so as to selectively engage the clutch 42 or 40 and thereby selectively couple the gear 38 or 36 to the shaft 14 for driving the latter. The arrangement is such that both clutches 40 and 42 cannot be engaged at the same time.

A single valve 120 of the unit 104 provided with a handle 122 is connected by fluid lines 124 and 126 to a cap 128 mounted on the transmission housing 10 around the outwardly projecting end of the shaft 16 for supplying fluid through ducts in the shaft 16 to the hydraulic cylinders of the clutches 72 and 54 for selectively controlling the same in a manner similar to that in which the clutches 40 and 42 are controlled by the valve 114. Thus the handle 122 of valve 120 may be shifted from neutral to one position to engage the clutch 54 for coupling the gear 44 to the shaft 16 for driving the latter, or the handle 122 may be shifted from neutral to its opposite position so that the clutch 72 will couple the gear 64 to the shaft 16 for driving the latter in a reverse direction.

The clutches 58 and 70 are similarly controlled by a valve 130 having a handle 132 and connected by fluid lines 134 and 136 to a cap 138 on the projecting end of the shaft 18 for supplying fluid through ducts in the shaft 18 to the hydraulic cylinders of the clutches 58 and 70. Thus the clutches 40 and 42 may be selectively controlled so as to drive the shaft 14 at two different speeds from the shaft 12, and the double gear unit 48 and 50 may be disposed so as to selectively drive the gears on the shafts 16 and 18 at two different speeds from the shaft 14. Then by manipulating the valves 120 and 130, the clutches 54, 72, 70 and 58 may be controlled so as to drive the final drive gear on each side. Thus the final drive gear 28 on one side may be driven simultaneously and in the same direction with the gear 28 on the other side by proper manipulation of the valves 120 and 130, or the gear 28 on one side may be driven in one direction while the gear 28 on the opposite side is driven in the opposite direction, or gear 28 on one side may be driven in either direction while the other side is not driven at all.

The housing 10 as illustrated comprises a main section 140 and an end cap 142 suitably secured together and providing an enclosing housing for the gears, shafts and other working parts of the transmission and a support for the bearings for the shafts. A supply of lubricant is maintained in the housing 10 for lubricating the working parts thereof and to provide a supply for the pump 100. In addition, the housing 10 is provided with sections 144 and 146 which are bolted or otherwise suitably secured together so as to provide a rugged support for the output shafts 24, the axles 26, and the gears carried thereby.

Figure 6:
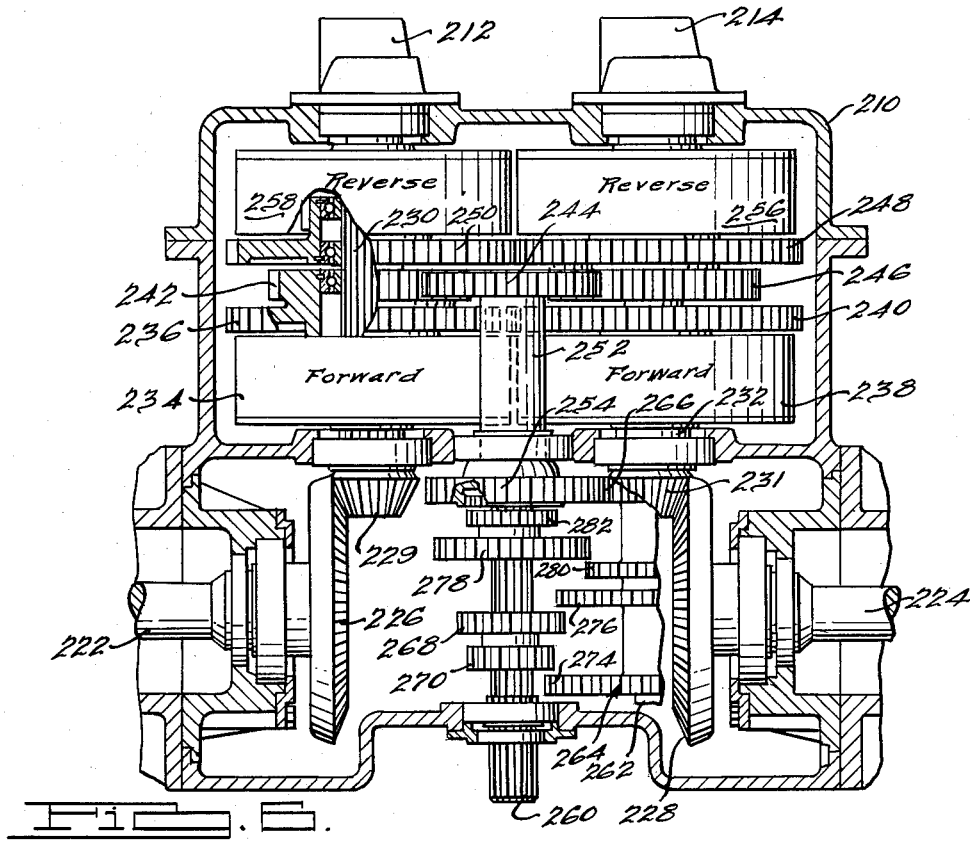
Figure 6 is a fragmentary sectional view illustrating a modified form of the invention.
Figure 7:
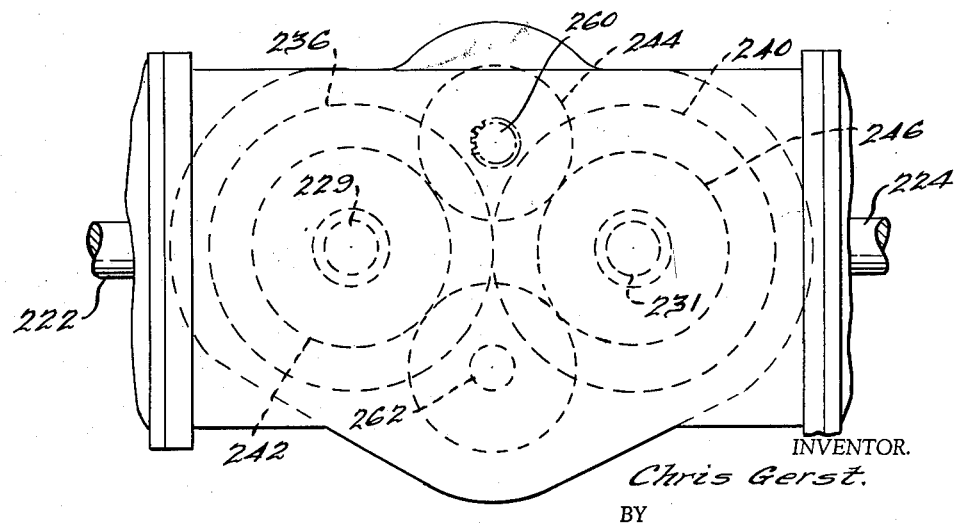
Figure 7 is a front elevational view of the transmission shown in Figure 6.

The transmission illustrated in Figures 6 and 7 is also a four-speed forward and reverse counter-rotating transmission, and includes output shafts 222 and 224, like the output shafts 22 and 24, arranged to drive the final output gears like the gears 28 shown in Figures 1 to 5. Similarly, the shafts 222 and 224 are provided with bevel gears 226 and 228, like the gears 77 and 76, the gear 226 meshing with the bevel pinion 229 on clutch shaft 230, while the bevel gear 228 meshes with bevel pinion 231 on clutch shaft 232. The clutch shafts 230 and 232 and the gears and clutches thereon are essentially the same as the shafts 16 and 18 of Figure 1 and the gears and clutches thereon. Thus the normally disengaged hydraulically actuated multiple disc clutch 234 on the shaft 230 is adapted to couple gear 236 to the shaft 230 for driving the latter, while a similar clutch 238 on the shaft 232 is adapted when engaged to couple the gear 240 to the shaft 232 for driving the latter. The gear 236 is one gear of a double gear unit which is freely rotatable on the shaft, and the teeth of the gear 236 are in constant mesh with the teeth of the gear 240 whereby the gears 236 and 240 will rotate at the same speed but in opposite directions, the gear 240 being journaled on the shaft 232.

The other gear 242 of the double gear unit on the shaft 230 is in constant mesh with a drive gear 244 so as to be driven thereby, and the teeth of such drive gear 244 are also in constant mesh with the teeth of a gear 246 of a double gear which is journeled on the shaft 232.

The other gear 248 of the double drive gear on the shaft 232 is in constant mesh with a gear 250 which is journaled on the shaft 230. The drive gear 244 is fixed on an input shaft 252 which also has a gear 254 thereon. A normally disengaged, hydraulically actuated multiple disc clutch 256 is operatively disposed on the shaft 232 between the gear 248 thereon and the shaft 232 and is effective when engaged for coupling the shaft 232 to the gear 248 so as to be driven thereby. A similar clutch 258 mounted on the clutch shaft 230 is operatively disposed between the gear 250 and the shaft 230 and is adapted when engaged to couple the shaft 230 to the gear 250 whereby the shaft 230 will be driven from the gear 250. The shafts 230 and 232 project from the rear of the transmission housing 210 where they are provided with caps or couplings 212 and 214 like the caps 128 and 138, whereby the hydraulic cylinders of the clutches 234, 238, 256 and 258 may be selectively supplied with hydraulic fluid under pressure for engaging the clutches in the same manner in which the corresponding clutches 54, 58, 70 and 72 are engaged.

An input shaft 260 is arranged in line with the shaft 252, and a countershaft 262 is arranged parallel to and below the shaft 260. A gear cluster 264 on the countershaft 262 is provided with a gear 266 in constant mesh with gear 254. A double gear unit including gears 268 and 270 is slidably splined on the shaft 260 so that the teeth of the gear 270 may be meshed with the teeth of the gear 274 of the gear cluster whereby the shaft 252 and the gear 244 thereon will be driven from the shaft 260 through the gear cluster and the gears 266 and 254. The double gear 268, 270 is shiftable also in the other direction to engage the teeth of gear 268 with the teeth of gear 276 of the gear cluster so as to provide another speed drive between the shafts 260 and 252. Another gear 278 is slidably splined on the shaft 260 and is adapted to have its teeth mesh with the teeth of the gear 280 of the gear cluster so as to provide a third speed drive between the shaft 260 and the shaft 252. The gear 278 is provided with a set of radially extending clutch teeth 282 which are adapted upon shifting of the gear 278 in the other direction for engagement with the internal clutch teeth provided in the hub of the gear 254 whereby the shaft 260 may be coupled directly with the shaft 252.

The modification shown in Figure 8 is essentially the same as that shown in Figures 6 and 7, and accordingly like numerals will be used to indicate like parts. However, in the transmission of Figure 8 the input shaft 300 has gears 302 and 304 fixed thereon, the same being in constant mesh with gears 306 and 308 on input shaft 314. A normally disengaged, hydraulically actuated multiple disc clutch 316 on the shaft 314 is operatively disposed between the gear 308 and the shaft 314 and is adapted when engaged to couple the gear 308 to the shaft 314 for driving the latter. A similar clutch 318 is provided for coupling the gear 306 to the shaft 314 for driving the same. The clutches 316 and 318 are like the clutches 40 and 42 of Figure 1 and are controlled in the same manner. Thus, by control of the clutches 316 and 318, the shaft 314 may be selectively driven at two different speeds from the shaft 300. The shaft 314 is shown in its developed position in Figure 8, but actually it is so disposed that the gear 315 journaled thereon is in constant mesh with the gears 242 and 246. Actually the gear 315 occupies the same position as the gear 244 of the transmission of Figure 6. A shiftable clutch member 317 slidably splined on the shaft 314 is shiftable in one direction so as to couple the gear teeth 319 thereon with the teeth of the gears 236 and 240, or in the other direction to couple the clutch teeth 321 thereon with the clutch teeth internally provided in the hub of the gear 315 so as to couple the latter to the shaft 314 for rotation therewith. The construction and operation of the transmission shown in Figure 8 are otherwise the same as in Figure 7, except that the gears 242 and 236 are more widely spaced in Figure 8 to accommodate the three different positions of the shiftable clutch member 317.

Preferably in all of the modifications illustrated, suitable braking means are provided for braking each of the road wheels or driving sprockets so as to permit the operator to lock or brake the road wheel or driving sprocket on one side of the vehicle while the other side is being driven. Such braking means may be associated with the drums of the clutches on the clutch shafts having the bevel pinions thereon, such for example as the shafts 16 and 18 of Figure 1. A combined clutch and brake construction of this type is disclosed in my prior application Serial No. 759,655, filed September 8, 1958.

While I have illustrated and described preferred embodiments of my invention, it is understood that these are capable of modification, and I therefore do not wish to be limited to the precise details set forth but desire to avail myself of such changes and alterations as fall within the purview of the following claims.

I claim:

1. A power transmission and steering axle comprising an input shaft having a double gear slidably splined thereon, a first clutch shaft having a double gear journaled thereon, said gears of said double gear on said input shaft being selectively engageable with the gears of said double gear on said clutch shaft, a normally disengaged multiple disc clutch adapted when engaged for coupling said double gear on said clutch shaft to said clutch shaft for driving the same, a second clutch shaft, a first gear journaled thereon and in constant mesh with one of the gears of said double gear on said first clutch shaft, a normally disengaged multiple disc clutch on said second clutch shaft and operable when engaged for coupling said first gear thereon to said second clutch shaft for driving the same, a double gear journaled on said second clutch shaft, a normally disengaged multiple disc clutch journaled on said second clutch shaft and adapted when engaged to couple said double gear thereon to said second clutch shaft for driving the same, an idler gear having its teeth in mesh with one of the gears of said double gear on said second clutch shaft and with the other gear of the double gear on said first clutch shaft, a single gear journaled on said first clutch shaft, a normally disengaged multiple disc clutch journaled on said first clutch shaft and adapted when engaged for coupling said single gear thereon to said first clutch shaft for driving the same, said single gear on said first clutch shaft having its teeth in constant mesh with the teeth of the other of said gears of said double gear on said second clutch shaft, a pair of output shafts disposed in line, one of said output shafts being coupled to one of said clutch shafts so as to be driven thereby and the other of said output shafts being coupled to the other of said clutch shafts so as to be driven thereby.

2. A power transmitting mechanism comprising an input shaft, a gear thereon and adapted to be driven thereby, a first clutch shaft having a double gear journaled thereon and arranged to be driven by said gear on said input shaft and a single gear journaled thereon, a normally disengaged multiple disc clutch adapted when engaged for coupling said double gear on said clutch shaft to said clutch shaft for driving the same, a second clutch shaft, a first gear journaled thereon and in constant mesh with one of the gears of said double gear on said first clutch shaft, a normally disengaged multiple disc clutch on said second clutch shaft and operable when engaged for coupling said first gear thereon to said second clutch shaft for driving the same, a double gear journaled on said second clutch shaft, a normally disengaged multiple disc clutch journaled on said second clutch shaft and adapted when engaged to couple said double gear thereon to said second clutch shaft for driving the same, said double gear on said second clutch shaft being geared to the other gear of the double gear on said first clutch shaft, a normally disengaged multiple disc clutch journaled on said first clutch shaft and adapted when engaged for coupling said single gear thereon to said first clutch shaft for driving the same, said single gear on said first clutch shaft having its teeth in constant mesh with the teeth of the other of said gears of said double gear on said second clutch shaft, a pair of output shafts disposed in line, one of said output shafts being coupled to one of said clutch shafts so as to be driven thereby and the other of said output shafts being coupled to the other of said clutch shafts so as to be driven thereby.

3. A power transmitting mechanism comprising a first clutch shaft having a double gear journaled thereon, a normally disengaged clutch adapted when engaged for coupling said double gear on said clutch shaft to said clutch shaft for driving the same, a second clutch shaft, a first gear journaled thereon and geared to one of the gears of said double gear on said first clutch shaft, a normally disengaged clutch on said second clutch shaft and operable when engaged for coupling said first gear thereon to said second clutch shaft for driving the same, a double gear journaled on said second clutch shaft, a normally disengaged clutch journaled on said second clutch shaft and adapted when engaged to couple said double gear thereon to said second clutch shaft for driving the same, said double gear on said second clutch shaft being geared to the other gear of said double gear on said second clutch shaft, a pair of output shafts disposed in line, one of said output shafts being coupled to one of said clutch shafts so as to be driven thereby and the other of said output shafts being coupled to the other of said clutch shafts so as to be driven thereby.

4. A power transmitting mechanism according to claim 3 including an input shaft and a gear arranged to be driven thereby and geared to one of the gears of one of said double gears.

5. A power transmitting mechanism according to claim 3 including an input shaft and a gear thereon geared to one of the gears of each of said double gears.

6. A power transmitting mechanism according to claim 3 including an input shaft and multi-speed gearing operatively disposed between said shaft and one of the gears of one of said double gears.

7. A power transmitting mechanism according to claim 3 including a first input shaft, a second input shaft disposed parallel to said input shaft and said clutch shafts, multi-speed clutch controlled gearing between said input shafts, and multi-speed clutch controlled gearing between said second input shaft and said clutch shafts.

8. A power transmitting mechanism comprising a first clutch shaft having a double gear journaled thereon, a normally disengaged multiple disc clutch adapted when engaged for coupling said double gear on said clutch shaft to said clutch shaft for driving the same, a second clutch shaft, a first gear journaled thereon and in constant mesh with one of the gears of said double gear on said first clutch shaft, a normally disengaged multiple disc clutch on said second clutch shaft and operable when engaged for coupling said first gear thereon to said second clutch shaft for driving the same, a double gear journaled on said second clutch shaft, a normally disengaged multiple disc clutch journaled on said second clutch shaft and adapted when engaged to couple said double gear thereon to said second clutch shaft for driving the same, said double gear on said second clutch shaft being geared to the other gear of the double gear on said first clutch shaft, a single gear journaled on said first clutch shaft, a normally disengaged multiple disc clutch journaled on said first clutch shaft and adapted when engaged for coupling said single gear thereon to said first clutch shaft for driving the same, said single gear on said first clutch shaft having its teeth in constant mesh with the teeth of the other of said gears of said double gear on said second clutch shaft, a pair of output shafts disposed in line, one of said output shafts being coupled to one of said clutch shafts so as to be driven thereby and the other of said output shafts being coupled to the other of said clutch shafts so as to be driven thereby.

9. A power transmitting mechanism according to claim 8 wherein said double gears are geared together by an idler gear.

10. A power transmitting mechanism according to claim 8 wherein said double gears are geared together by a common drive gear.

11. A power transmitting mechanism according to claim 8 wherein said double gears are geared together by an idler gear and wherein said idler gear is mounted on an input shaft and is arranged to be driven thereby.

12. A power transmitting mechanism according to claim 8 including an input shaft drivingly connected to the gears on said clutch shafts, and multi-speed gearing operatively associated with said input shaft.

13. A power transmitting mechanism comprising an input shaft having a drive gear thereon, a first clutch shaft having a double gear journaled thereon, the teeth of one of the gears of said double gear being in constant mesh with said drive gear, a normally disengaged multiple disc clutch on said first clutch shaft adapted when engaged to couple said double gear with said clutch shaft, a second clutch shaft having a double gear journaled thereon, one of the gears of said double gear on said second clutch shaft having its teeth in constant mesh with the teeth of said drive gear, a normally disengaged multiple disc clutch on said second clutch shaft adapted when engaged to couple the double gear thereon to said second clutch shaft, a second gear journaled on said second clutch shaft and having its teeth in constant mesh with the teeth of the other of the double gears on said first clutch shaft, a normally disengaged multiple disc clutch on said second clutch shaft adapted when engaged to couple said second gear thereon to said second clutch shaft, a second gear journaled on said first clutch shaft and having its teeth in constant mesh with the teeth of the other gear of the double gear on said second clutch shaft, a normally disengaged multiple disc clutch on said first clutch shaft adapted when engaged to couple said second gear thereon to said first clutch shaft, said input and clutch shafts being disposed in parallel, a pair of output shafts disposed in line and extending normal to said clutch shafts, one of said output shafts being coupled to one of said clutch shafts so as to be driven thereby, and the other of said output shafts being coupled to the other of said clutch shafts so as to be driven thereby.

14. A power transmission and steering axle comprising a pair of shafts disposed in parallel, each having a bevel pinion fixed thereon for rotation therewith, a pair of output shafts disposed in line and normal to said parallel shafts, one of said output shafts being geared to one of said bevel pinions so as to be driven thereby, and the other of said output shafts being geared to the other of said bevel pinions so as to be driven thereby, a forward gear and a reverse gear journaled on each of said bevel pinion shafts, said forward gears being in constant mesh with each other and said reverse gears being in constant mesh with each other, a normally disengaged multiple disc clutch operatively disposed between each of said gears and the shaft on which it is journaled and operable when engaged to couple such gear to its shaft for rotation therewith, an input shaft disposed in parallel with said parallel shafts and gearing including a gear on and rotatable with said input shaft for driving said forward and reverse gears on both shafts simultaneously whereby the forward gear on each bevel pinion shaft rotates in one direction and the reverse gear on such bevel pinion shaft rotates in the opposite direction.

15. A power transmission and steering axle according to claim 14 wherein the teeth of said gear on said input shaft are arranged to mesh with the teeth of one of said forward gears.

16. A power transmission and steering axle according to claim 14 wherein the teeth of said gear on said input shaft are in constant mesh with a third gear on each bevel pinion shaft, said third gear on one of said shafts being rotatable with the forward gear thereon and said third gear on the other of said shafts being rotatable with the reverse gear thereon.

17. A power transmission and steering axle according to claim 14 wherein the teeth of said gear on said input shaft are in constant mesh with a third gear on each bevel pinion shaft, said third gear on one of said shafts being rotatable with the forward gear thereon and said third gear on the other of said shafts being rotatable with the reverse gear thereon, a clutch is disposed between said gear on the input shaft and the input shaft whereby such gear may be coupled to the input shaft for rotation therewith or permitted to freely rotate thereon, said clutch forming part of a second gear on the input shaft the teeth of which are adapted to be meshed with the teeth of one of said forward gears for driving said forward gears from said input shaft.

18. A power transmission and steering axle according to claim 14 wherein said gearing includes a gear rotatable with the forward drive gear on one bevel pinion shaft and a gear rotatable with the reverse drive gear on the other bevel pinion shaft and wherein said gear on the input shaft is in constant mesh with said gears rotatable with said forward and reverse drive gears.

19. A power transmission and steering axle according to claim 14 wherein said gearing includes a gear rotatable with the forward drive gear on one bevel pinion shaft and a gear rotatable with the reverse drive gear on the other bevel pinion shaft and wherein said gear on the input shaft is in constant mesh with said gears rotatable with said forward and reverse drive gears, and a clutch is disposed between said gear on the input shaft and the input shaft whereby such gear may be coupled to the input shaft for rotation therewith or permitted to freely rotate thereon, said clutch forming part of a second gear on the input shaft the teeth of which are adapted to be meshed with the teeth of one of said forward gears for driving said forward gears from said input shaft.

20. A power transmission and steering axle assembly for tractor type vehicles having axially aligned driving axle members on opposite sides thereof, said assembly comprising a pair of shafts disposed in parallel, each having a bevel pinion fixed thereon for rotation therewith, a pair of output shafts disposed in line and normal to said parallel shafts, one of said output shafts being geared to and thereby driven from one of said bevel pinions so as to provide a power transmitting drive for one of said axle members, and the other of said output shafts being geared to and thereby driven from the other of said bevel pinions so as to provide a power transmitting drive for the other of said axle members, first and second gears journaled on each of said bevel pinion shafts, a normally disengaged clutch operatively disposed between each of said gears and the bevel pinion shaft on which it is journaled and operable when engaged to couple such gear to its respective shaft for rotation therewith, an input shaft disposed in parallel with said parallel shafts, gearing operatively disposed between said input shaft and said first and second gears on both of said bevel pinion shafts for simultaneously driving such gears, and control means operable for selectively engaging the clutches on each bevel pinion shaft independently of the clutches on the other bevel pinion shaft whereby each output shaft may be driven independently of the other, or at the same or different speeds.

21. A power transmission and steering axle assembly according to claim 20 wherein said first gears are in constant mesh with each other and said second gears are in constant mesh with each other.

22. A power transmission and steering axle assembly, according to claim 20 wherein said first gears are in constant mesh with each other and said second gears are in constant mesh with each other, said first gear on one bevel pinion shaft is one gear of a double gear and said second gear on the other bevel pinion shaft is one gear of a double gear and wherein a gear on and rotatable with said input shaft is in constant mesh with the other gears of said double gears.

References Cited in the file of this patent

UNITED STATES PATENTS

| | | |
|---|---|---|
| 2,158,320 | Bock | May 16, 1939 |
| 2,866,350 | Gerst | Dec. 30, 1958 |
| 2,866,360 | Gerst et al. | Dec. 30, 1958 |